(12) United States Patent
Saltsman et al.

(10) Patent No.: US 10,174,661 B1
(45) Date of Patent: Jan. 8, 2019

(54) APPARATUSES AND METHODS FOR COOLING EXHAUST GAS EMITTED FROM AN INTERNAL COMBUSTION ENGINE IN A MARINE DRIVE

(71) Applicant: Brunswick Corporation, Lake Forest, IL (US)

(72) Inventors: Aaron K. Saltsman, Appleton, WI (US); Philip R. Walker, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/414,827

(22) Filed: Jan. 25, 2017

(51) Int. Cl.
| | |
|---|---|
| F01N 3/04 | (2006.01) |
| F01N 3/02 | (2006.01) |
| F01N 13/00 | (2010.01) |
| F01N 13/10 | (2010.01) |
| F01P 3/20 | (2006.01) |

(52) U.S. Cl.
CPC ............. *F01N 13/004* (2013.01); *F01N 3/04* (2013.01); *F01N 13/10* (2013.01); *F01P 3/20* (2013.01); *F01N 3/046* (2013.01); *F01N 2260/024* (2013.01); *F01P 2050/02* (2013.01)

(58) Field of Classification Search
CPC .. F01N 13/004; F01N 13/082; F01N 2260/02; F01N 2270/02; F01N 3/046; F01N 13/10
USPC .................... 60/298, 299, 310, 317
See application file for complete search history.

(56) References Cited

U.S. PATENT DOCUMENTS

| | | | |
|---|---|---|---|
| 4,573,318 A | 3/1986 | Entringer et al. | |
| 4,845,945 A | 7/1989 | Widmer et al. | |
| 6,035,633 A * | 3/2000 | Woods .................... | B63H 21/32 |
| | | | 440/88 J |
| 6,155,896 A * | 12/2000 | Suzuki .................. | B63B 35/731 |
| | | | 114/55.5 |
| 8,403,717 B1 | 3/2013 | White et al. | |
| 8,651,908 B1 * | 2/2014 | Glodowski ............ | B63H 21/32 |
| | | | 440/89 R |
| 8,899,029 B1 | 12/2014 | Dreyer et al. | |

* cited by examiner

*Primary Examiner* — Phutthiwat Wongwian
*Assistant Examiner* — Diem Tran
(74) *Attorney, Agent, or Firm* — Andrus Intellectual Property Law, LLP (57) ABSTRACT

Apparatuses and methods are for cooling exhaust gas emitted from an internal combustion engine in a marine drive. An upstream exhaust conduit is configured to convey exhaust gas from the internal combustion engine. A cooling jacket is located on the upstream exhaust conduit. A cooling passage is located radially between the upstream exhaust conduit and the cooling jacket. The cooling passage is configured to convey cooling fluid along an outer periphery of the upstream exhaust conduit to a location where the cooling fluid is mixed with the exhaust gas. A downstream exhaust conduit conveys the exhaust gas from the upstream exhaust conduit. An orifice device is configured to radially outwardly spray the cooling fluid from the cooling passage onto an inner radial surface of the downstream exhaust conduit so that the cooling fluid cools the downstream exhaust conduit and mixes with and cools the exhaust gas.

16 Claims, 7 Drawing Sheets

APPARATUSES AND METHODS FOR COOLING EXHAUST GAS EMITTED FROM AN INTERNAL COMBUSTION ENGINE IN A MARINE DRIVE

FIELD

The present disclosure relates to apparatuses and methods for cooling exhaust gas emitted from an internal combustion engine in a marine drive.

BACKGROUND

The following U.S. patents are incorporated herein by reference, in entirety:

U.S. Pat. No. 4,573,318 discloses a marine propulsion system provided with an exhaust elbow having an intake exhaust passage extending upwardly from the engine and communicating through a bend with a discharge exhaust passage. A cooling jacket has pockets around the exhaust passages for cooling the latter. A central channel extends longitudinally along the exterior of the exhaust passages to guide water to the end of the discharge exhaust passage to mix with exhaust. The central channel has a pair of sidewalls extending longitudinally and laterally tapered away from each other at the outer end of the discharge exhaust passage to create an outward draw from the central channel to minimize break-up of longitudinally outward water flow and maintain the end tip of the discharge exhaust passage dry and prevent water ingestion and creeping back into the discharge exhaust passage due to pulsations of the engine. Dam and port structure is also provided enabling faster heating of the exhaust passage and in turn minimizing condensation within the elbow which may otherwise ingest back into the engine.

U.S. Pat. No. 8,403,717 discloses a marine propulsion system having an exhaust conduit that conveys exhaust gases from an internal combustion engine. The exhaust conduit has a dry portion and a wet portion located downstream of the dry portion. Cooling fluid enters the exhaust conduit to cool exhaust gases flowing through the wet portion. A bypass conduit is connected to the exhaust conduit and conveys a portion of the cooling fluid away from the dry portion to thereby decrease reversion of cooling fluid into the dry portion.

U.S. Pat. No. 8,899,029 discloses apparatuses for marine propulsion systems having an internal combustion engine. The apparatuses comprise an exhaust conduit conveying exhaust from the internal combustion engine; a cooling jacket on the exhaust conduit; and a cooling passage between the exhaust conduit and the cooling jacket. The cooling passage guides flow of cooling liquid from upstream to downstream towards a location where the cooling liquid is mixed with exhaust in the exhaust conduit. First and second baffles are axially spaced apart and extend transversely with respect to the cooling passage so as to disperse the flow of cooling liquid at the location where the cooling liquid is mixed with the exhaust, thereby reducing reversion of cooling liquid in the exhaust conduit. At least one catalyst and at least one oxygen sensor are disposed in the exhaust conduit. The oxygen sensor is adjacent to and oriented parallel to a downstream face of the catalyst so that exhaust flows perpendicularly across the sensor.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

Apparatuses and methods for cooling exhaust gas emitted from an internal combustion engine in a marine drive are disclosed herein. In certain examples, an upstream exhaust conduit is configured to convey the exhaust gas from the internal combustion engine. A cooling jacket is located on the upstream exhaust conduit. A cooling passage is located radially between the upstream exhaust conduit and the cooling jacket. The cooling passage is configured to convey cooling fluid along an outer periphery of the upstream exhaust conduit to a location where the cooling fluid is mixed with the exhaust gas. A downstream exhaust conduit conveys the exhaust gas away from the upstream exhaust conduit. An orifice device is configured to radially outwardly spray the cooling fluid from the cooling passage onto inner radial surface of the downstream exhaust conduit so that the cooling fluid efficiently and effectively cools the downstream exhaust conduit and mixes with and cools the exhaust gas. The methods disclosed herein can comprise: conveying the exhaust gas from the internal combustion engine through an upstream exhaust conduit and then through a downstream exhaust conduit; conveying cooling fluid along an outer periphery of the upstream exhaust conduit; and radially outwardly spraying the cooling fluid onto an inner radial surface of the downstream exhaust conduit so that the cooling fluid mixes with and cools the exhaust gas.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Through research and development, the present inventors have found that it can be difficult to ensure optimal cooling of downstream exhaust gas in a marine drive, and particularly in stern drive arrangements. There are a number of variables to consider, including for example exhaust tube diameters, misalignment at the connection between an exhaust elbow and the downstream exhaust conduit, tolerance stack up, installation procedures, and/or the like. The present inventors have also found that known marine exhaust systems can suffer from "water reversion", which is the tendency of an exhaust system to pull water back towards the engine, and for example onto a catalyst and/or an oxygen sensor associated with the catalyst. Water reversion is particularly problematic at idle or low speeds due to reverse exhaust pulses originating from the engine. Water that is pulled back into the catalyst and/or associate exhaust sensor ultimately evaporates and leaves mineral deposits on the oxygen sensor, which reduce functionality.

Thus, the present inventors have endeavored to improve existing exhaust system configurations for marine drives. The present disclosure is a result of these efforts.

Figure 1:
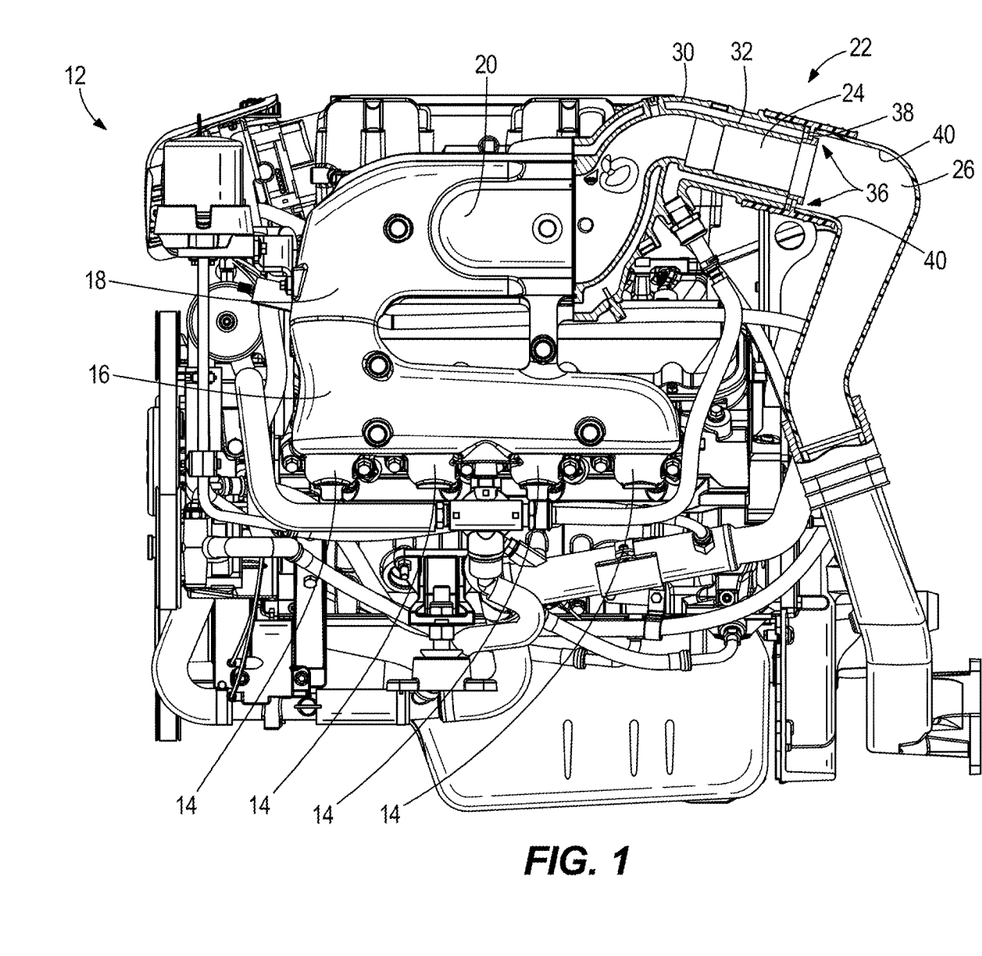
FIG. 1 is a side view of an internal combustion engine and associated exhaust system for a marine drive, shown partially in section view.
Figure 3:
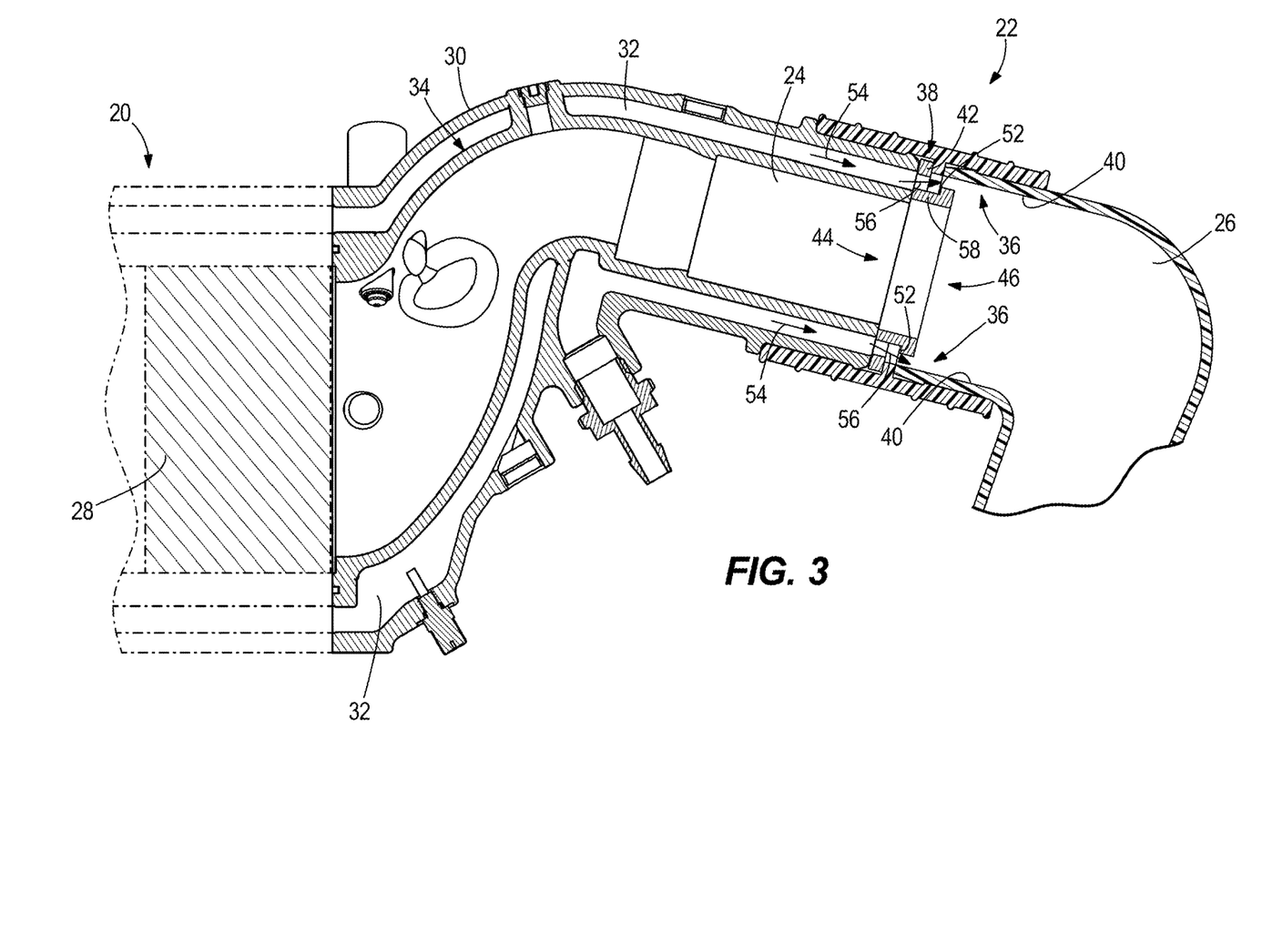
FIG. 3 is a sectional view showing the first example of the orifice device within the exhaust system on the internal combustion engine.

FIG. 1 depicts portions of an internal combustion engine 12 for a marine drive. The internal combustion engine 12 is configured for use in a conventional stern drive arrangement; however it should be noted that the present invention is not limited for use with stern drives. In the illustrated example, a plurality of exhaust ports 14 receives exhaust gas from the internal combustion engine 12. The number of exhaust ports 14 is exemplary and can vary from what is shown. The exhaust gas is conveyed through the exhaust ports 14 and then mixed in an exhaust manifold 16. From the exhaust manifold 16, the exhaust gas is conveyed through a series of exhaust conduits, which in the illustrated example includes a header 18, a catalyst housing 20, and an exhaust elbow 22 having an upstream exhaust conduit 24 and then a downstream exhaust conduit 26, which discharges the exhaust gas, for example through a conventional underwater passage in the stern drive. The configuration of the series of exhaust conduits can also vary from what is shown. For example, the catalyst housing is an optional feature and can optionally include a catalyst 28 (FIG. 3) for treating the exhaust gas. Thus, FIGS. 1 and 3 depict an exhaust system that conveys the exhaust gas from upstream to downstream through the exhaust manifold 16, header 18, catalyst housing 20 (and associated catalyst 28), and the exhaust elbow 22, including the noted upstream exhaust conduit 24 and downstream exhaust conduit 26. In the example shown, the downstream exhaust conduit 26 bends vertically downwardly and at an angle from the downwardly angled exhaust elbow 22.

A cooling jacket 30 is disposed on the exhaust manifold 16, header 18, catalyst housing 20, and upstream exhaust conduit 24. The cooling jacket 30, together with the exhaust manifold 16, header 18, catalyst housing 20 and upstream exhaust conduit 24, defines a cooling passage 32 located radially between the cooling jacket 30 and the exhaust manifold 16, header 18, catalyst housing 20 and upstream exhaust conduit 24. As described further below with reference to FIG. 11, the cooling passage 32 is part of a cooling circuit 80 that is configured to convey cooling fluid through the internal combustion engine 12 and along an outer periphery of these components to a mixing location 36 (to be described further herein) where the cooling fluid is mixed with and cools the exhaust gas. According to the present disclosure, an orifice device 38 is located at the mixing location 36 and is specially configured to radially outwardly spray (i.e. radially outwardly disperse) the cooling fluid at a relatively higher flow velocity from the cooling passage 32 onto an inner radial surface 40 of the downstream exhaust conduit 26, so that that the cooling fluid is applied to and effectively cools the inner radial surface 40 of the downstream exhaust conduit 26 and the associated exhaust gas that is flowing through the downstream exhaust conduit 26. The exact physical configuration of the orifice device 38 can vary, as demonstrated by the several examples described further herein below. The orifice device 38 can be formed by a separate part or be integrally formed with a component of the exhaust conduit. As shown by example herein below, the orifice device 38 is uniquely configured to increase the flow velocity of the cooling fluid as it is conveyed to the mixing location 36 where the cooling fluid is mixed with the exhaust gas and to radially redirect the cooling fluid onto the inner radial surface 40 to thereby achieve effective cooling results.

Figure 2:
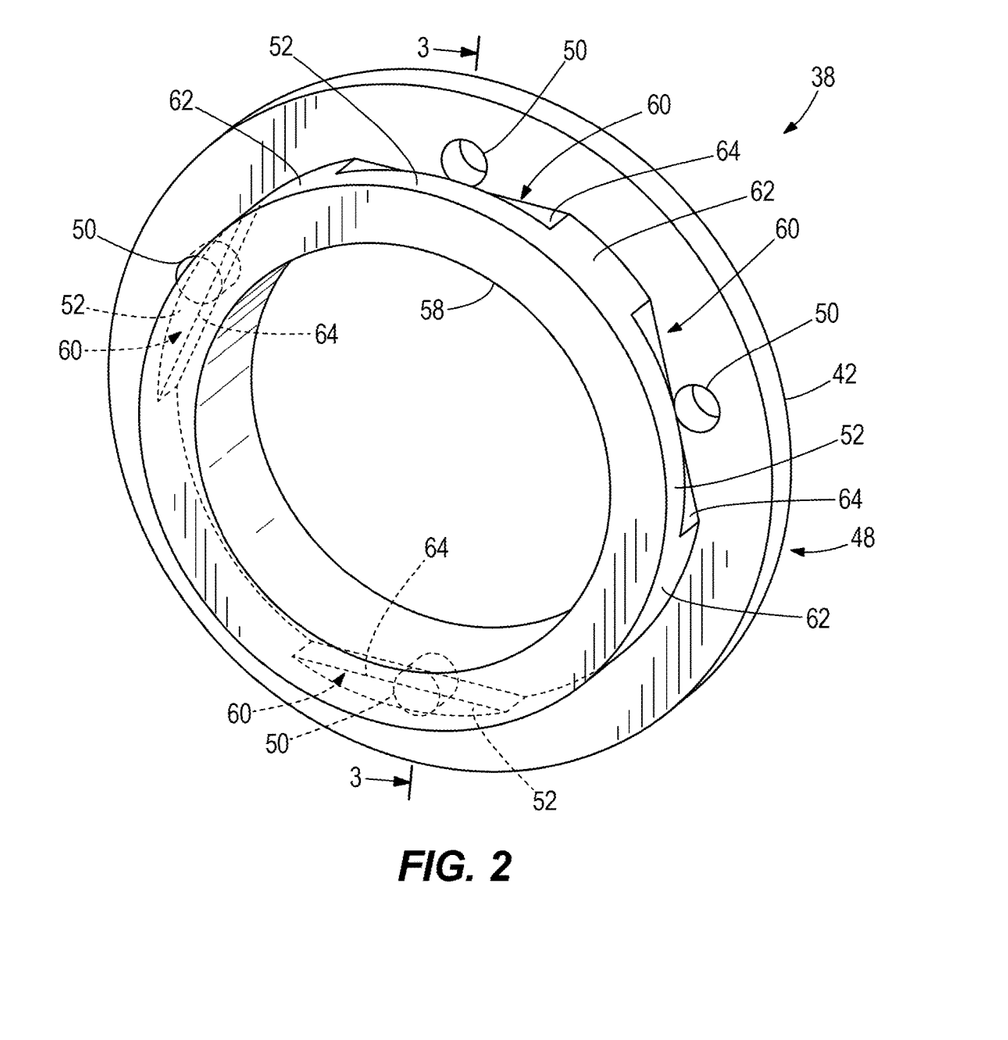
FIG. 2 is a perspective view of a first example of an orifice device that is configured to cause cooling fluid to mix with and cool exhaust gas emitted from the internal combustion engine.

FIGS. 2 and 3 depict a first example of the orifice device 38. In this example, the orifice device 38 includes a generally circular plate 42 that is disposed between the downstream end 44 of the upstream exhaust conduit 24 and the upstream end 46 of the downstream exhaust conduit 26. The shape of the plate can vary from what is shown. The circular plate 42 forms a radial end wall 48 on the upstream exhaust conduit 24 and cooling jacket 30, and more particularly on the downstream end of the cooling passage 32, at the mixing location 36. A plurality of axially extending through-bores 50 are formed in the circular plate 42 and are configured to accelerate the flow velocity of cooling fluid from the cooling passage 32 to the mixing location 36 in the downstream exhaust conduit 26. More specifically, the reduced flow area provided by the through-bores 50 raises the pressure of the cooling fluid and increases the flow velocity. The cross-sectional areas of the through-bores 50 can vary from what is shown. In some examples, the reduced cross-sectional areas can be tailored by the system designer to achieve a preferred increase in flow velocity.

A corresponding plurality of baffles 52 are located immediately downstream of the plurality of through-bores 50. Each baffle 52 is specially configured to redirect the flow of cooling fluid from the depicted axial flow 54 into a radially outward flow 56. The exact configuration of the baffles 52 can vary from what is shown. In this first example, the baffles 52 are formed on or radially extend from a radially inner extension ring 58 that axially extends from the radial end wall 48 of the circular plate 42. More particularly, each baffle 52 is formed by a cutout 60 that is tangentially cut out of the radially outer perimetral surface 62 of the inner extension ring 58. As shown in FIG. 2, the cutout 60 has a tangentially extending flat surface 64 with respect to the radially outer perimetral surface 62. The baffle 52 is formed by the remaining portion of the radially inner extension ring 58. The cutout 60 thus defines the shape of the baffle 52 upon which the axial flow 54 of cooling fluid impacts and is radially outwardly dispersed (e.g. sprayed) onto the inner radial surface 40 for effective cooling of the downstream exhaust conduit 26 and associated exhaust gas flowing there through.

Figures 4, 5:
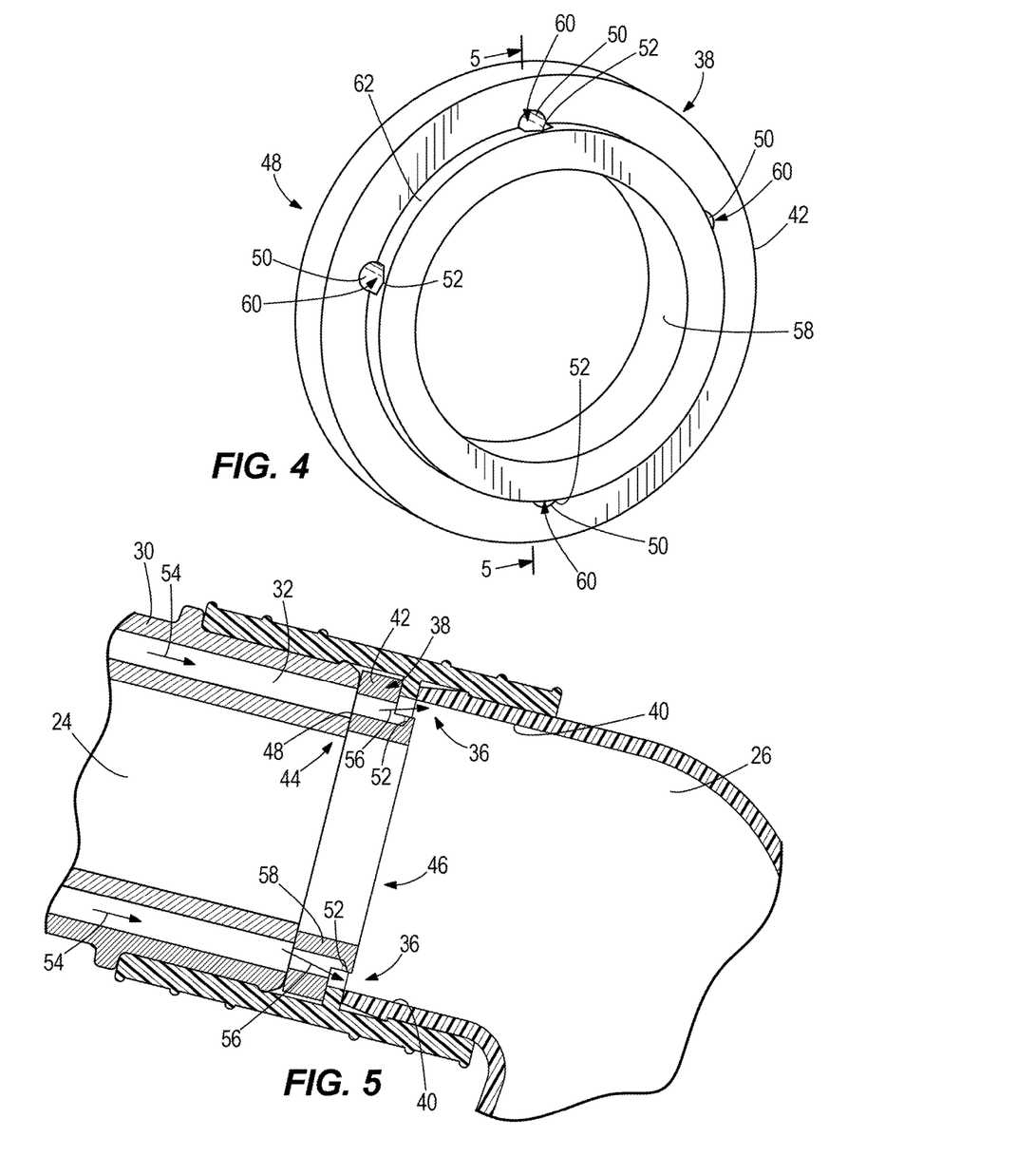
FIG. 4 is a perspective view of a second example of the orifice device.
FIG. 5 is a sectional view showing the second example of the orifice device within the exhaust system.

FIGS. 4 and 5 depict another example of the orifice device 38 wherein, instead of being formed by the tangentially extending flat surface 64 shown in FIGS. 2 and 3, the baffles 52 are formed by concave cutouts 60 formed in the inner extension ring 58. Each of the concave cutouts 60 has a concave inner contour with respect to the radially outer perimetral surface 62. The concave inner contour is sloped so as to redirect the axial flow 54 radially outwardly towards the inner radial surface 40, for the above-noted effective cooling of the downstream exhaust conduit 26 and cooling of the associated exhaust gas flowing there through.

Figure 6:
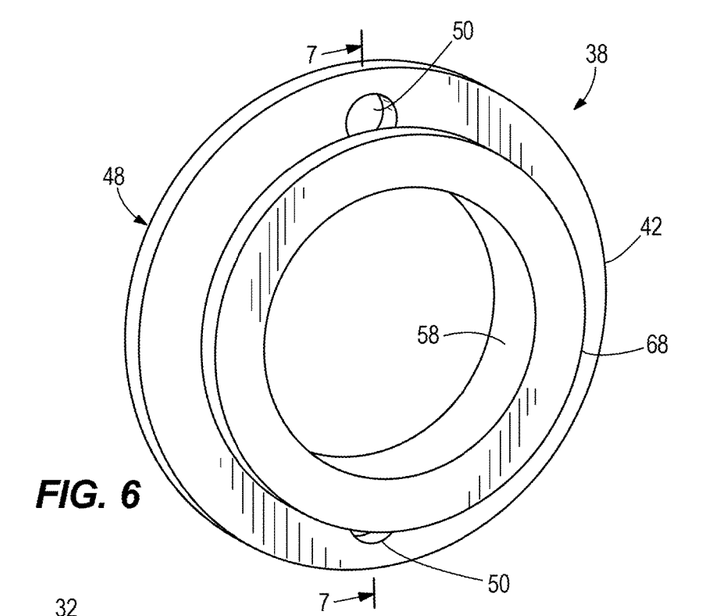
FIG. 6 is a perspective view of a third example of the orifice device.
Figure 7:
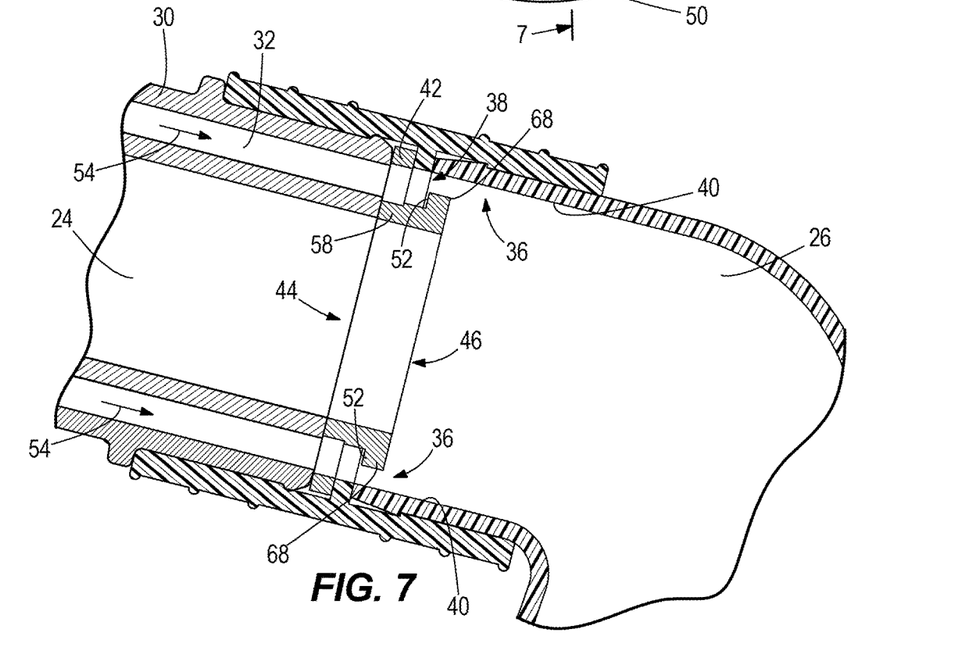
FIG. 7 is a sectional view showing the third example of the orifice device within the exhaust system.

FIGS. 6 and 7 depict a third example of the orifice device 38. In this example, the baffle 52 is formed by a radially extending end wall 68 that perpendicularly extends from the end of the inner extension ring 58, wherein the axial flow 54 of cooling fluid impinges upon the radially extending end wall 68 and is redirected into a radially outward flow 56 onto the inner radial surface 40, for the above-noted effective cooling of the downstream exhaust conduit 26 and cooling of the associated exhaust gas flowing there through. The radially extending end wall 68 extends peripherally around the entire circumference of the inner extension ring 58.

Figure 8:
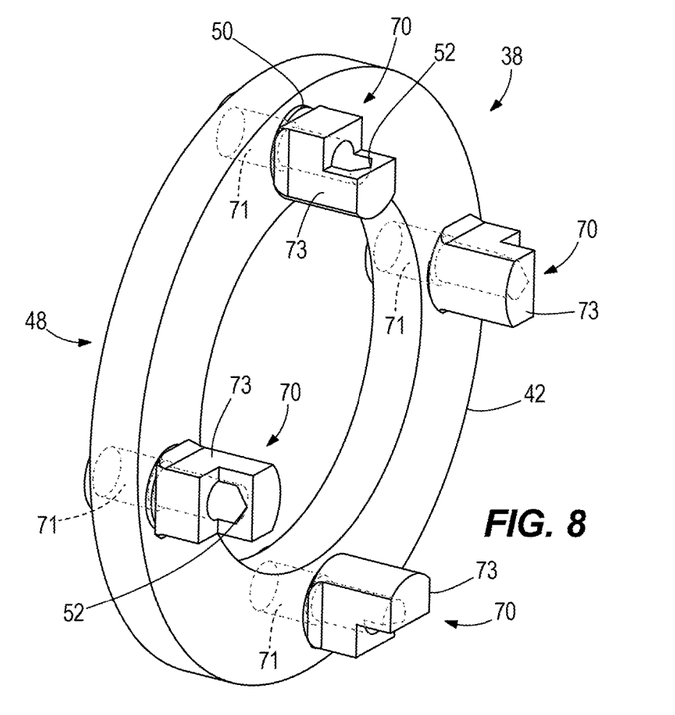
FIG. 8 is a perspective view of a fourth example of the orifice device.
Figures 9, 10:
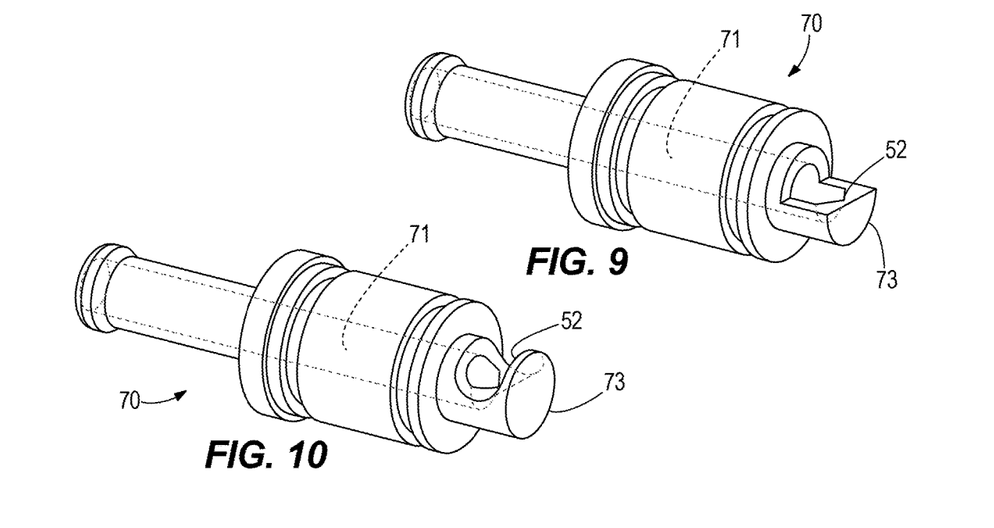
FIG. 9 is a perspective view of one example of a nozzle device.
FIG. 10 is a perspective view of another example of the nozzle device.

FIGS. 8 and 9 depict a fourth example wherein the orifice device includes a plurality of nozzles 70 located in (extending through) the respective plurality of through-bores 50. Each nozzle 70 forms a throughbore 71 for the cooling fluid and has a head 73 that has a baffle 52 configured to redirect the cooling fluid from the axial flow 54 to the radially outward flow 56 onto the inner radial surface 40, for the above-noted effective cooling of the downstream exhaust conduit 26 and cooling of the associated exhaust gas flowing there through. The shape of the head 73 and baffle 52 can vary and for example can form the above-noted cutout 60 or radially extending end wall 68.

FIG. 10 depicts a fifth example, having a different nozzle configuration. Comparison of FIGS. 9 and 10 illustrates that the exact shape of the head 73 and baffle 52 can vary and can be tailored to achieve a desired spray pattern and/or cooling characteristic depending upon particular cooling system and exhaust system characteristics for the internal combustion engine 12 and exhaust system.

As illustrated by the examples discussed herein above, the orifice device 38 can have a vertically lowermost through-bore 50 that is located at a vertically bottom portion of the radial end wall 48. The lowermost through-bore 50 has been found to effectively drain cooling fluid by gravity out of the cooling passage 32 and to the downstream exhaust conduit 26. Each of the above-described examples also can optionally include an uppermost through-bore 50 located on a vertically top portion of the circular plate 42, radially opposite of the lowermost through-bore 50. The first, second and fourth examples of the orifice device 38 also include a pair of side through-bores 50 located on opposite side portions of the radial end wall 48, higher than the lowermost through-bore 50 and lower than the uppermost through-bore 50. Other combinations and locations of the through-bores and/or nozzles can be implemented.

Figure 11:
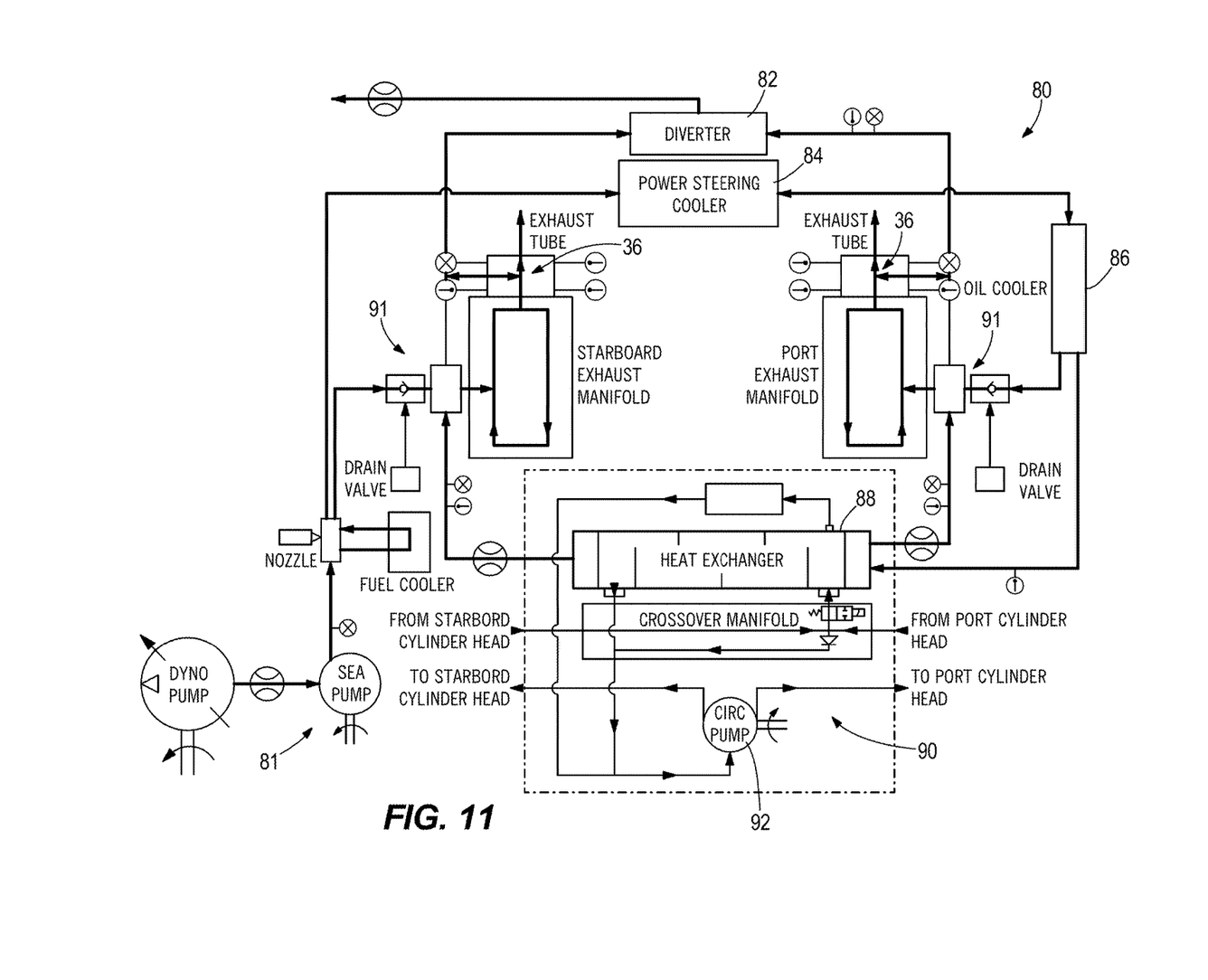
FIG. 11 is a cooling circuit diagram according to the present disclosure.

Now referring to FIG. 11, the cooling passage 32 is part of a cooling circuit 80 that conveys the cooling fluid from upstream to downstream through the internal combustion engine 12 and through cooling jackets on the noted exhaust system components. The exact configuration of the cooling circuit 80 can vary from what is shown. In the illustrated example, a sea pump 81 pumps relatively cold water from a surrounding body of water in which the marine drive is operating. The cooling water is pumped (as cooling fluid) through a cooling jacket associated with power steering cooler 84 and through a cooling jacket associated with oil cooler 86. The cooling water then flows through a heat exchanger 88 that exchanges heat between the cooling water and coolant (e.g., glycol) pumped through a second cooing circuit 90 by a coolant recirculation pump 92. From the heat exchanger 88, the cooling water flows to a Tee-fitting 91 that allows the cooling water to flow either to the cooling jacket 30 and orifice device 38 at the mixing location 36 or through a bypass valve 82 that is configured to permit a portion of the cooling fluid in the cooling circuit 80 to bypass the orifice device 38. Inclusion of the bypass valve 82 in the cooling circuit 80 advantageously allows for more precise control of the amount and temperature of the cooling water flowing to the orifice device 38 and mixing location 36. More specifically, a reduced amount of cooling water at the mixing location 36 advantageously allows the cooling water to more quickly heat up and change phase. The amount of diverted cooling fluid can vary and will depend on the exact configuration of the internal combustion engine 12 and associate exhaust system. In some examples, approximately ⅓ of the cooling water can be diverted by the bypass valve 82. The bypass valve 82 can also be utilized to increase the cooling fluid pressure in the cooling passage 32 and at the mixing location 36. The amount of cooling fluid pressure can vary and in some examples includes 12 kPa at idle speed and 24 kPa at full engine speed. The higher pressure allows for directed higher velocity water that is fanned out across the inner radial surface 40 of the downstream exhaust conduit 26, and is spread out by exhaust pulses, vibration and gravity. Radially directing the reduced flow of cooling water onto inner radial surface 40 advantageously prevents reverse engine pulses from pulling cooling water back upstream onto the catalyst 28 and associate oxygen sensor 29 and potentially reduces hydro-lock of the internal combustion engine 12.

Advantageously, the orifice device can be configured to speed up and fan out (spray) cooling water so that it creates a sheet of water. The sheet of water will adhere to the inner surface of the downstream exhaust conduit due to surface tension. The sheet of water effectively forms a barrier layer that prevents most of the exhaust gases from touching the downstream exhaust conduit for a certain distance along the length of the downstream exhaust conduit. The sheet of water is radially disposed between the downstream exhaust conduit and the exhaust gases flowing therethrough. Typical exhaust gas flow is turbulent enough to mix with the innermost surface of the sheet of water to thereby cool the exhaust gases; however a large portion of the exhaust gases are cooled from the evaporative cooling of the cooling water.

Advantageously, according to some examples, the cooling fluid is spread outwards directly onto the parts that require cooling and can be tailored to accomplish substantially the same flow pattern and coating of all surfaces regardless of exhaust conduit diameter, misalignment, and engine installation angle. Also the cooling fluid that is diverted by the bypass valve 82 is typically excess flow that is not needed for adequate cooling of the exhaust system. At higher engine speeds, the reduction in water flow increases the area available for all exhaust gases, which reduces exhaust back pressure. A reduction in exhaust backpressure can advantageously increase power output.

Thus, according to the present disclosure, systems and methods are provided for marine drive arrangements wherein cooling water is mixed with the exhaust gas directed at a relatively higher pressure compared to the prior art and specifically directed radially outwardly at the inner radial surface of the downstream exhaust conduit, to thereby effectively coat the radially inner surface of the downstream exhaust conduit. The reduced flow area and water diverting feature (i.e. the orifice device 38 and the bypass valve 82 in the cooling circuit 80) together provide improved control and results of the cooling features.

In the present description, certain terms have been used for brevity, clearness and understanding. No unnecessary limitations are to be implied therefrom beyond the requirement of prior art, because such terms are used for descriptive purposes only and are intended to be broadly construed. The different apparatuses and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph only if the terms "means for" or "step for" are explicitly recited in the respective limitation.

What is claimed is:

1. An apparatus for a marine drive having an internal combustion engine, the apparatus comprising:
   an upstream exhaust conduit portion configured to convey exhaust gas from the internal combustion engine;
   a cooling jacket on the upstream exhaust conduit portion;
   a cooling passage located radially between the upstream exhaust conduit portion and the cooling jacket, the cooling passage being configured to convey cooling fluid along an outer periphery of the upstream exhaust conduit portion to a mixing location where the cooling fluid is mixed with the exhaust gas;
   a downstream exhaust conduit portion that conveys the exhaust gas from the upstream exhaust conduit portion;
   a radial end wall disposed between the upstream exhaust conduit portion and the cooling jacket, the radial end wall having a through-bore through which the cooling fluid flows towards the mixing location, wherein the through-bore causes a flow velocity of the cooling fluid to increase prior to mixing with the exhaust gas; and
   a baffle located downstream of the through-bore, wherein the baffle redirects the cooling fluid from an axial flow with respect to the upstream and downstream exhaust conduit portions to a radially outward flow, so that the cooling fluid is sprayed onto an inner radial surface of the downstream exhaust conduit portion and cools the downstream exhaust conduit portion while also mixing with and cooling the exhaust gas at the mixing location.

2. The apparatus according to claim 1, wherein the baffle is formed on a radially inner extension ring that axially extends from the radial end wall.

3. The apparatus according to claim 2, wherein the baffle is defined within a cutout in a radially outer perimetral surface of the radially inner extension ring.

4. The apparatus according to claim 3, wherein the cutout has a concave contour with respect to the radially outer perimetral surface.

5. The apparatus according to claim 3, wherein the cutout has a tangentially flat surface with respect to the radially outer perimetral surface.

6. The apparatus according to claim 1, further comprising a nozzle in the through-bore, wherein the baffle is part of the nozzle.

7. The apparatus according to claim 1, wherein the through-bore is one of a plurality of through-bores that are spaced apart around the outer periphery of the upstream exhaust conduit portion.

8. The apparatus according to claim 7, wherein the plurality of through-bores comprises a lowermost through-bore located at a vertical bottom portion of the radial end wall so that the lowermost through-bore drains cooling fluid by gravity from the cooling passage.

9. The apparatus according to claim 8, wherein the plurality of through-bores further comprises an uppermost through-bore located on a vertical top portion of the radial end wall, radially opposite the lowermost through-bore.

10. The apparatus according to claim 8, wherein the plurality of through-bores further comprises a pair of side through-bores located on opposite side portions of the radial end wall and located higher than the lowermost through-bore.

11. The apparatus according to claim 1, wherein the marine drive is a stern drive and wherein the upstream exhaust conduit portion comprises an exhaust elbow, and wherein the downstream exhaust conduit portion extends vertically downwardly from the exhaust elbow.

12. The apparatus according to claim 1, wherein the cooling passage is part of a cooling circuit that conveys the cooling fluid through the internal combustion engine.

13. The apparatus according to claim 12, further comprising a bypass valve located in the cooling circuit, the bypass valve being configured to permit a portion of the cooling fluid in the cooling circuit to bypass the mixing location.

14. The apparatus according to claim 13, wherein the portion of the cooling fluid in the cooling circuit is discharged from the marine drive.

15. A method of cooling exhaust gas emitted from an internal combustion engine in a marine drive, the method comprising:
   conveying the exhaust gas from the internal combustion engine through an upstream exhaust conduit portion and then through a downstream exhaust conduit portion;
   conveying cooling fluid along an outer periphery of the upstream exhaust conduit portion; and
   with a through-bore in a radial end wall between the upstream exhaust conduit portion and a cooling jacket on the upstream exhaust conduit portion and a baffle located downstream of the through-bore, radially outwardly spraying the cooling fluid onto an inner radial surface of the downstream exhaust conduit portion so that the cooling fluid cools the downstream exhaust conduit portion and mixes with and cools the exhaust gas;
   wherein the through-bore increases a flow velocity of the cooling fluid and the cooling fluid is deflected by the baffle towards the inner radial surface and a mixing location where the cooling fluid is mixed with the exhaust gas.

16. The method according to claim 15, further comprising causing a portion of the cooling fluid to bypass the location where the cooling fluid is mixed with the exhaust gas.

* * * * *